United States Patent [19]

Noyon

[11] 4,090,623

[45] May 23, 1978

[54] SYSTEM FOR HANDLING A CONTAINER

[75] Inventor: Gustave Maurice Noyon, Paris, France

[73] Assignee: Societe Internationale d'Investissements et de Participations par abreviation Interpar, Paris, France

[21] Appl. No.: 770,763

[22] Filed: Feb. 22, 1977

[51] Int. Cl.² .............................................. B65G 67/30
[52] U.S. Cl. ................................. 214/38 D; 214/515; 52/194
[58] Field of Search ............ 214/38 R, 38 CC, 38 D, 214/515, 2, 501; 52/122, 143, 194

[56] References Cited

U.S. PATENT DOCUMENTS

| 2,606,673 | 8/1952 | Young | 214/38 BA |
|---|---|---|---|
| 3,155,248 | 11/1964 | Haller | 214/501 X |
| 3,985,254 | 10/1976 | Grandury | 214/515 |

Primary Examiner—Albert J. Makay
Attorney, Agent, or Firm—Wenderoth, Lind & Ponack

[57] ABSTRACT

The system for handling a container comprises a vehicle on which the container may bear in the transporting position and which comprises at least one jack for raising or lowering the container by pivoting it about an axis of pivotal connection between the container and the vehicle, and a fixed installation for receiving the container in the position of use, which comprises a device for locking the vehicle, after the vehicle has moved rearwardly. The position of use of the container is an inclined position in which the lower end part of the container is set in position in a frame of the fixed installation. The axis of the pivotal connection between the container and the vehicle is embodied by two articulations, each of which articulations comprises a male element having a surface of revolution about a horizontal axis and connected to the container and a female element connected to the vehicle and comprising a conjugate surface of revolution to which surface of revolution there are connected divergent surfaces. The frame of the fixed installation comprises two fixed cradles disposed symmetrically with respect to a median longitudinal plane. Each of the cradles comprises two longitudinally spaced spaced bearing surfaces which are conjugate to faces of the corresponding container corner.

20 Claims, 15 Drawing Figures

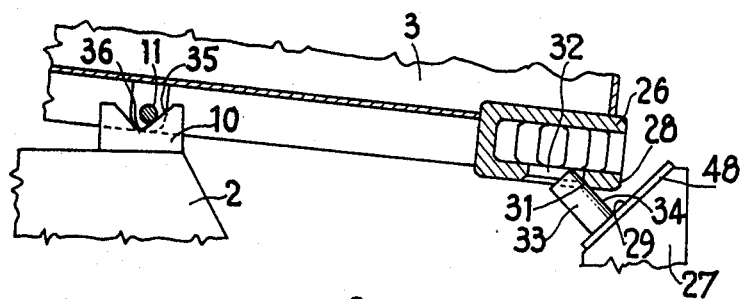
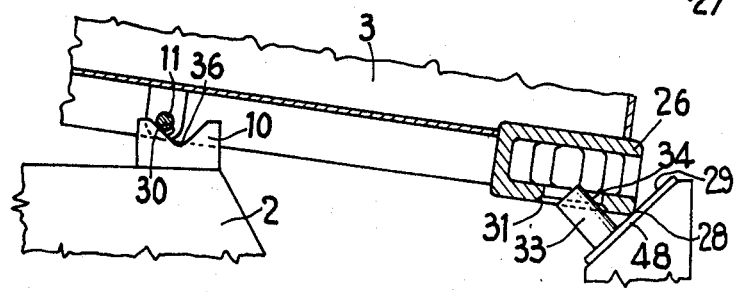
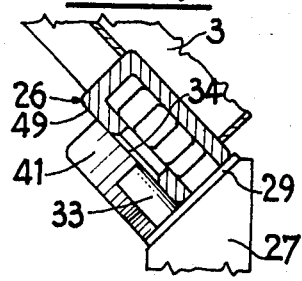
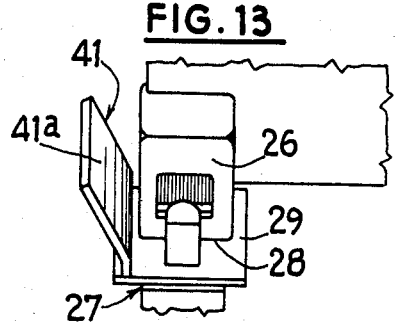
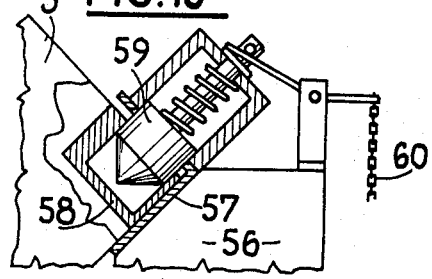
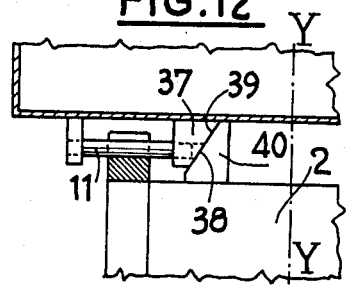
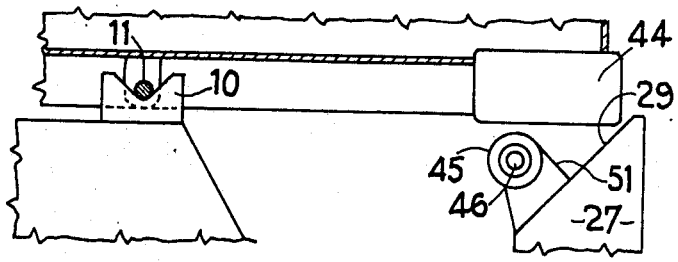

SYSTEM FOR HANDLING A CONTAINER

BACKGROUND OF THE INVENTION

The present invention relates to a system for effecting in succession the transportation on a road vehicle a container which has received a granular, pulverulent or liquid product at a filling station, the placing in a fixed installation of a full container for use, after the departure of the vehicle, as storage means, for example as a silo or cistern, and, after the placing of the full container, the taking of an empty container located at another site by means of the vehicle for bringing it to the filling station.

Many arrangements have been proposed for solving this problem but all have drawbacks. In French Pat. No. 2,240,883 (Poirier), the container is held, in the course of pivoting, in a cradle mounted on the fixed equipment to pivot about an axis which is on principle coincident with the pivot, the pivot pin connecting the container to the vehicle. Bearing in mind that this pin is longitudinally offset with respect to the point of the rear part of the vehicle which is exactly positioned vertically and laterally, it is in practice impossible — owing in particular to the variations in height that may be undergone by the coupling bolster normally provided in the front of the vehicle (which is most often constituted by a semi-trailer) for its coupling to a tractor — to achieve coincidence between the axis of the articulation of the moving cradle and pivot axis of the articulation of the container on the vehicle. Moreover, the final position of the container on the fixed installation is vertical, which requires the use of auxiliary jacks during the final stage for placing the container on the fixed installation, for braking the descending movement.

Moreover, there is known from British Pat. No. 704,550 (Devis) a handling device for unloading a silo from a vehicle and putting it in an inclined position of use, but this device only lends itself to the treatment of cylindrical silos of small dimensions and in any case cannot be employed for handling heavy rectangular-sided containers such as those widely employed at the present time.

SUMMARY OF THE INVENTION

An object of the invention is to overcome the drawbacks of known apparatus.

According to the invention, there is provided a system for handling a container usable as storage means, for example as a silo, and provided at one of its ends with at least two corners which are disposed symmetrically with respect to the medium longitudinal plane of the container, each of which corners defines three, preferably trirectangular faces, said systems comprising a vehicle on which the container may bear in the transporting position and which comprises at least one jack for raising or lowering the container by pivoting it about an axis of pivotal connection between the container and the vehicle, and a fixed installation for receiving the container in the position of use, which comprises means for locking the vehicle, after the vehicle has moved rearwardly, said system comprising the following features:

the position of use of the container is an inclined position in which the lower end part of the container is set in position in a frame of the fixed installation;

the axis of the pivotal connection between the container and the vehicle is embodied by two articulations, each of which articulations comprises a male element having a surface of revolution about a horizontal axis and a female element comprising a conjugate surface of revolution to which surface of revolution there are connected divergent surfaces, said elements being symmetrically laterally mounted, one element being mounted on the container and the other element on the vehicle, and being, under the effect of the force of gravity, in mutual supporting relation by their surfaces of revolution for the transporting position and in the course of the pivoting corresponding to the start of the raising operation, while being disengageable from each other in the course of said raising operation;

the frame of the fixed installation comprises two fixed cradles disposed symmetrically with respect to a median longitudinal plane, each of the cradles comprising two longitudinally spaced bearing surfaces which are conjugate to the corresponding corner of the container to ensure, after the locking of the central region of the rear of the vehicle and during the raising, the angular movement of the container, the self-centering of the container, that is to say the putting of the median longitudinal planes of the container and the fixed frame into coincidence, and the setting of the container in the inclined position of use.

In the course of the raising, after at least one of the rear lower corners has come into contact with the associated cradle, each edge of the container is constantly carried at three points, one of which points is formed by support means connected to the jack or to the jacks, whereas the other two points are formed either on the articulation between the container and the vehicle and on one of the bearing surfaces of the cradle, or by the two bearing surfaces of the cradle. The container can therefore be moved in a continuous jerk-free manner.

The vehicle — in the middle of its rear lower part — and the fixed equipment — in its centre and substantially at the same height — are provided with conjugate means serving as a longitudinal abutment for the vehicle at the end of the rearward movement, the arrangement being such that if the driver reverses the vehicle toward the fixed installation at an excessively large angle with respect to the plane of symmetry of the installation, or if the vehicle has an excessive lateral offset, the locking is impossible and, moreover, the container cannot come into contact with the cradles. At the end of rearward movement of the vehicle, and when the locking has been effected, the cradles are located in the vicinity of the corners of the container, the distance between the cradles and the corners always being very small with respect to the distance between the corners and the articulations of the container and the vehicle.

When, for putting the container on the site, the driver has the luck to exactly centre the container with respect to the frame of the fixed installation, the two rear lower corners of the container remain on the same level during the raising operation and effect exactly synchronized movements. There is first a pivoting about the horizontal axis common to the surfaces of revolution of the articulations, then contact of the two corners with the rear support surface of the cradles, sliding of the corners on said surface and simultaneously relative sliding between the male articulation element and the front divergent surface of the female articulation element and the front divergent surface of the female articulation element until the corners reach the front bearing surface of the cradles, one of two elements of each articulation then rising relative to the other until the final position of inclination is reached.

When the plane of symmetry of the container makes a small but non-zero angle with the plane of symmetry of the fixed installation, which almost always occurs, five distinct stages can be observed in the course of the operation for putting the container in the position of use under the action of the jack or jacks of the vehicle.

The first stage, in the course of which the container pivots about the two articulations which pivotally connect it to the vehicle, terminates at the moment when, owing to the fact that the planes of symmetry of the container and the fixed equipment do not coincide, only one of the corners of the container, corresponding to a first side, comes in contact with the rear bearing surface of the associated cradle of the fixed installation.

In the course of the second stage, the second side of the container remains in bearing relation solely to the vehicle at the corresponding articulation and the first side of the container is simultaneously in bearing relation to the vehicle and the fixed frame. The first corner slides downwardly on the rear bearing surface of the corresponding cradle, which constitutes an abutment for the rearward direction of movement of the container, and simultaneously the male element of the first articulation slides on the front divergent surface of the corresponding female element, which constitutes an abutment for the forward direction of movement of the container. The second stage, which produces a slight swaying movement or "yaw" which causes the plane of symmetry of the container to approach the plane of symmetry of the fixed installation, stops when the second corner of the container comes into contact with the front bearing surface of the second cradle.

In the course of the third stage, on both sides, the container bears simultaneously on the vehicle in the region of the articulation and on the cradles. The slidings between the first corner and first cradle and the male element and female element in the first articulation occur as in the second stage, whereas the second corner slides downwardly on the front bearing surface of the associated cradle which constitutes a front abutment and the male element of the second articulation slides on the rear divergent surface of the associated female element which constitutes a rear abutment. The third stage, which produces another swaying movement or "yaw" which brings the plane of symmetry of the container very close to the plane of symmetry of the fixed installation, terminates at the moment when the male element and female element of the first articulation separate from each other.

In the course of the fourth stage, the container bears, on the first side, only on the fixed installation and, on the second side, simultaneously on the vehicle and on the fixed installation. On the first side, the corner slides on the two bearing surfaces of the cradle forming front and rear abutments; on the other or second side, the sliding occurs as before. The fourth stage, which produces a slight final swaying movement which puts the plane of symmetry of the container in coincidence with the plane of the fixed equipment, terminates at the moment when the male element and female element of the second articulation separate from each other.

In the course of the fifth stage, the container bears on both sides on the cradle of the fixed equipment, each corner sliding on the two bearing surfaces of its cradle. The fifth stage terminates when the container has reached its final inclination. Support means provided in the fixed installation in addition to the cradles are then united with the container.

Of course, abutment surfaces are provided to ensure that the container is laterally perfectly positioned on the vehicle in the road position and on the fixed installation in the position of use. The surfaces are inclined to the vertical so as to produce a progressive centering of the container on the fixed installation during its placing on the site. The lateral elasticity of the suspension of the vehicle permits avoiding any possible jamming before the aforementioned fourth stage has finished.

After the fifth stage, the supporting means act in such manner as to ensure the equilibrium of the container in the position of use and enables the driver to return to the road positions the mechanisms of the vehicle which had been used for putting the container on the site, and to unlock the vehicle from the fixed installation and leave with the vehicle, for example for taking an empty container from another fixed installation and effecting the same operations in the opposite direction.

Note that the container could advantageously be a standardized container whose lower standardized corners located at the rear cooperate with the cradles of the fixed installation.

Likewise, the supporting means brought into action at the end of the aforementioned fifth stage, may be constituted in accordance with the teaching of French Pat. No. 2,296,544, by a gantry supporting the front of the container or by an auxiliary support disposed behind the cradles for positively retaining the upper corners of the lower end wall of the container. It is also possible to employ masts which are capable of being dismantled and are disposed between bearing surfaces located, on one hand, under the front part of the container and, on the other hand, on the ground. Such an arrangement is similar to that described in French Pat. No. 2,271,069.

It will be observed that the handling system according to the invention permits the elimination of all the drawbacks of presently-known systems for placing in position, by means of the transporting vehicle, a container for pulverulent, granular or liquid materials, for its use as a storage apparatus, its position being then the most convenient for its unloading. Thus, within the scope of the invention, the container is transported full, the fixed installation requires no source of energy, the container can be of a standardized type, for example in conformity with ISO standards, the placing on the site or the taking up of the container can be carried out within a few minutes by the driver of the vehicle without outside aid, the positioning of the vehicle with respect to the fixed installation requiring no means other than longitudinal abutments and a locking device. The container is in table equilibrium throughout the operations for placing it on the site and taking up the container.

A better understanding of the invention will be had from the ensuing description, it being understood that arrangements other than those descriptions can be employed while remaining within the scope of the invention.

DESCRIPTION OF THE DRAWINGS

In the accompanying drawings:

FIGS. 9 and 10 are sectional views corresponding to FIGS. 6 and 8, in the course of a subsequent stage of the raising operation;

FIG. 11 is a sectional view of a corner of the container set or blocked in position in its cradle at the end of the raising;

FIG. 12 is a sectional view taken on line 12—12 of FIG. 1;

FIG. 13 is a transverse elevational view of a cradle and the corresponding corner;

FIG. 14 is a sectional view, to an enlarged scale of a modification of FIG. 8, and FIG. 15 is a view of means for locking the container in the position of use.

DETAILED DESCRIPTION OF THE INVENTION

Figure 1:
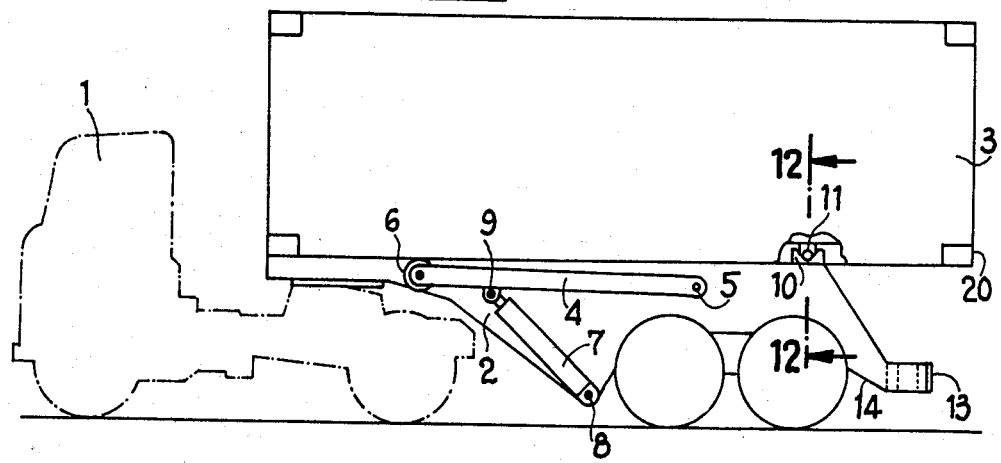
FIG. 1 is a side elevational view of a special transporting and handling semi-trailer loaded with a standardized container in the road position.
Figure 2:
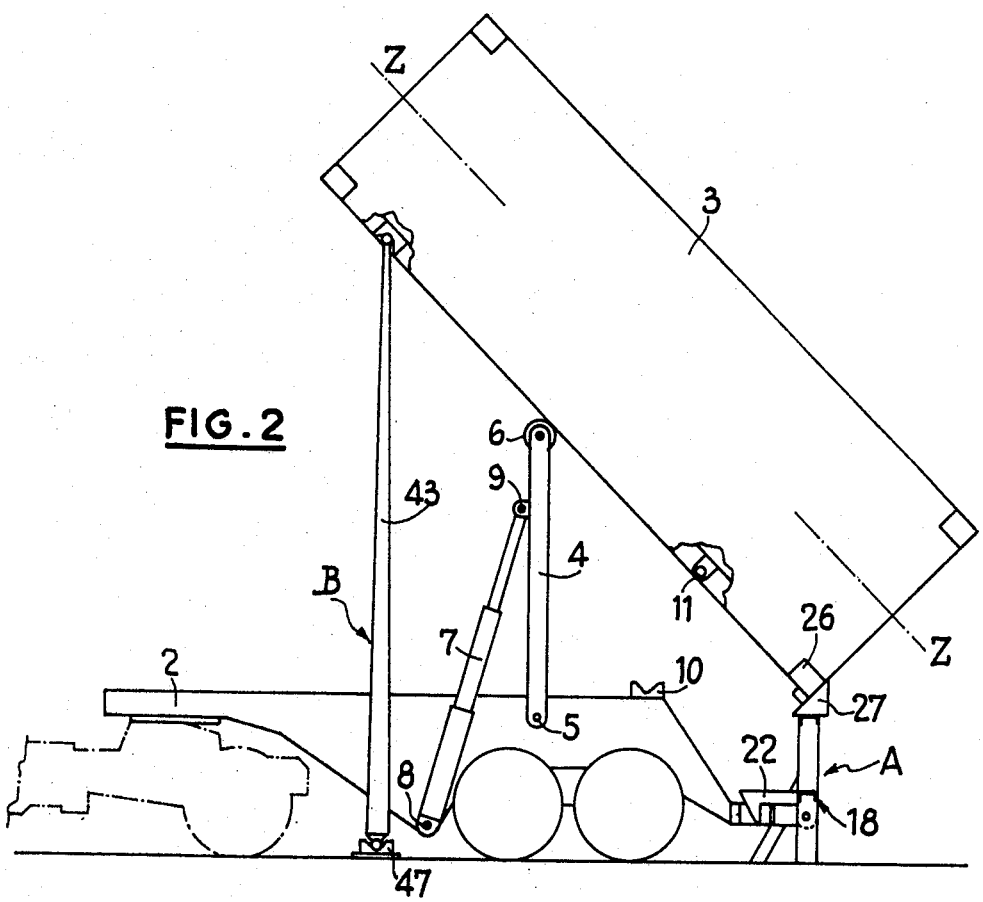
FIG. 2 is a side elevational view of the same semi-trailer locked to fixed equipment at the end of the operation for placing the container on a site.
Figure 3:
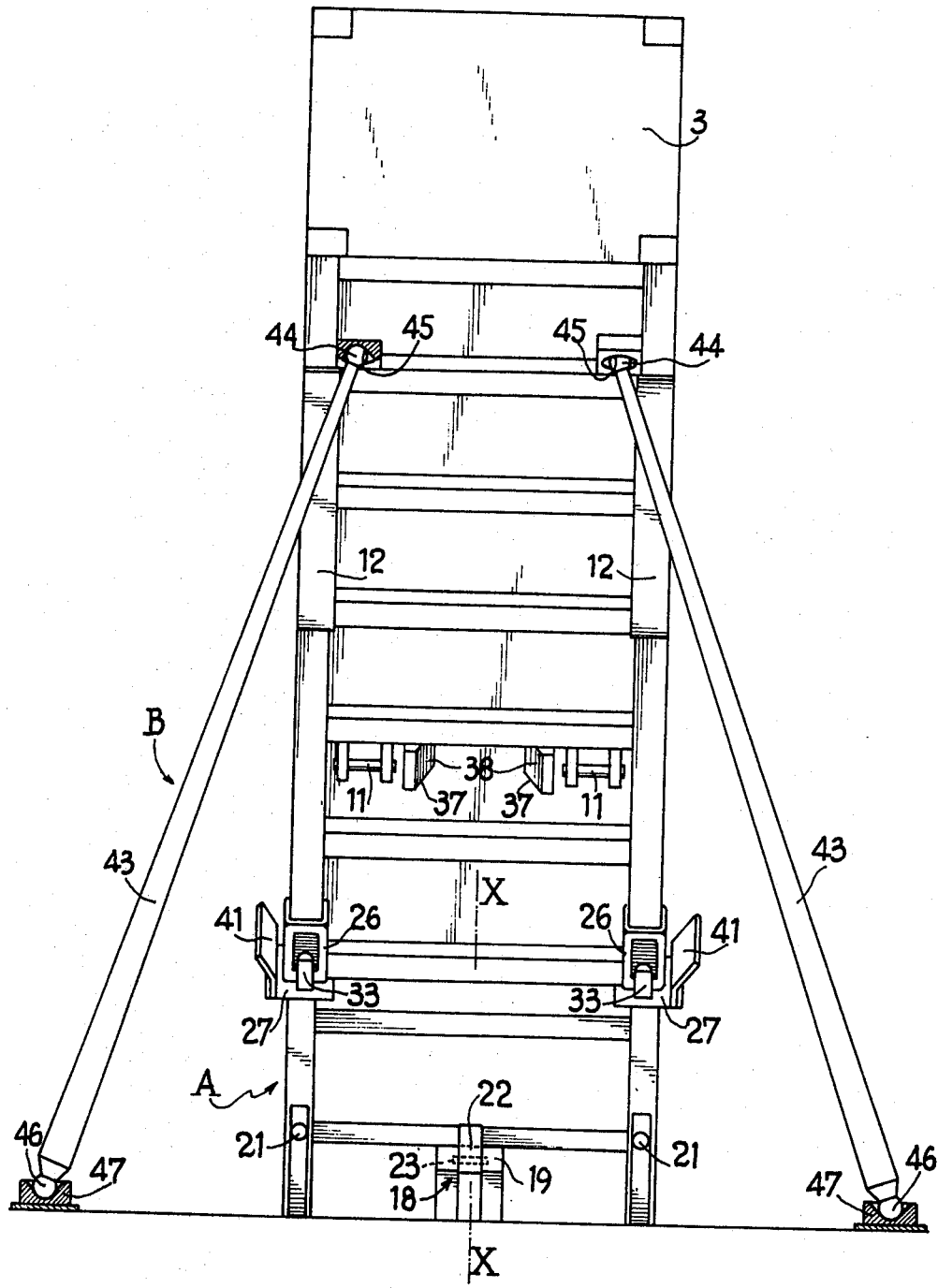
FIG. 3 is a front elevational view of the container in position of use.

The fixed installation, symmetrical with respect to a vertical plane X—X, comprises (FIGS. 2 and 3), at the rear, a frame A comprising two cradles 27—27 and, under the latter, a locking device 18 and, in the front, a supporting device B comprising two bearing members 47 for removable masts 43 the bearing members 47 being in accordance with for example the teaching of French Pat. No. 2,271,069.

The vehicle is constituted by a tractor 1 and a semi-trailer 2 adapted for transporting a rectangular-sided container 3 having standardized corners. The semi-trailer 2 is equipped on each side with an arm 4 mounted on the semi-trailer 2 to pivot about a pivot pin 5 and provided at its other end with a roller 6. Each arm 4 is shifted by a jack 7 which is pivoted to the semi-trailer 2 by a pin 8 and to the arm 4 by a pin 9. V-shaped bearings 10 are disposed on each side at the rear of the semi-trailer 2. In the road position, the container 3 bears adjacent the rear end, on the bearings 10 through its journals 11. The container is laterally perfectly centered owing to cooperation between the oblique surface 39 of two guide elements 40, disposed symmetrically on the semi-trailer with respect to the plane Y—Y, with complementary oblique surface 38 of a corresponding block 37 of the container, in which the rear journal 11 is fixed. Two plates 12 (FIG. 3) provided under the container 3 form runways for respective rollers 6 during the raising of the container by means of the jacks 7 and the placing thereof on the frame A with respect to which latter the semi-trailer initially took up the correct position.

The semi-trailer 2 is equipped at the rear with bumpers or fenders 13 disposed at the end of longitudinal members 14 in the region of a connecting cross-member 15. The vertical central planar part 16 of the cross-member 15, formed in a recess, is set back with respect to the bumpers 13 and is connected to the latter by two vertical planar faces 17 which are inclined with respect to the plane of symmetry Y—Y of the semi-trailer 2. The frame A comprises, substantially at the height of the bumpers 13, a central buffer 19 the width of which is less than the distance between the faces 17 by an amount corresponding to the precision that the driver can achieve in the centering of the semi-trailer. The frame A comprises two lateral buffers 21 also mounted at the height of the bumpers 13. The distance between the vertical plane through the end of the buffers 21 and the end face 20 of the central buffer 19 exceeds the distance between the rear face of the bumpers 13 and the vertical plane 16 of the cross-member 15. This arrangement enables the semi-trailer 2 to abut the central buffer 19 only if the angle that the plane of symmetry Y—Y of the semi-trailer 2 makes with the plane of symmetry X—X of the frame A is less than an angle which is small but compatible with a precision that it is possible to achieve with normal driving. If the driver has presented the semi-trailer 2 at an excessively large angle, one of the two bumpers 13 comes into contact with a lateral buffer 21 whereas the central part 20 of the central buffer 19 is not yet in contact with the planar face 16 of the cross-member 15 in which case the driver must repeat his manoeuvring until contact between the parts 20 and 19 is established.

The locking device 18 comprises a pin 23 carried by the frame A on which there is pivotally mounted a central lock member 22 whose nose 24 comprises a ramp 24a which, in coming into contact with the upper edge 16a of the part 16 in the course of the rearward movement of the semi-trailer, causes the nose to rise in pivoting about the pin 23. When the central part 16 of the cross-member 15 comes into abutment with the central buffer 19, the raised nose 24, after having slid over the upper face of the cross-member 15, drops by the effect of gravity, into an oblong aperture 25 in the cross-member 15 and locks the semi-trailer to the frame A. In this locked position, each of the lower rear corners 26 of the container 3 carried by the semi-trailer 2 is located above a cradle 27 of the frame A, without touching the cradle.

Each cradle 27 comprises a front bearing surface constituted by a cylindrical surface 34 whose generatrices are parallel to the direction in which the axis Z—Z of the container is oriented for the final inclined position of the latter (FIG. 2), this cylindrical surface being formed on the rear part of a stud 33 which is fixed in a position perpendicular to a plate 48 which defines a rear bearing surface 29 which is rearwardly and upwardly inclined. The configuration of the stud 13 is such that its upper end can penetrate an aperture 32 which extends through the planar lower face 49 of the corresponding corner 26 of the container and the the corner 26 bears on the cylindrical face 34 by the rear region of a chamfer 31 located between the inner cylindrical surface 50 of the aperture 32 and the lower planar face 44. Under these conditions, the rearwardly directed horizontal component of the force by which the container bears on the cylindrical surface 34 has a high value which facilitates the positioning of the container.

Each cradle 27 further comprises a lateral abutment 41 constituted by an outwardly inclined side wall.

Figure 6:
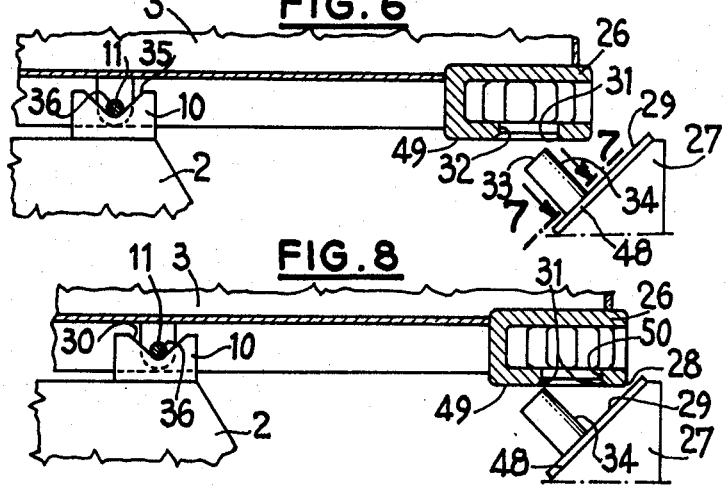
FIG. 6 is a longitudinal sectional view, to an enlarged scale, of the rear part of the left edge, as viewed in FIG. 4, of the container and of the vehicle locked longitudinally to the fixed installation, at the start of the raising operation.
Figure 8:
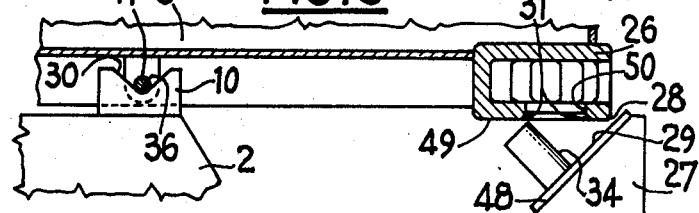
FIG. 8 is a view, corresponding to FIG. 6, of the right edge.

After the locking of the semi-trailer on the frame owing to the slight angle that the axis Y—Y of the semi-trailer makes with the axis X—X of the frame A, the two corners 26 have a different position longitudinally and laterally with respect to the respective cradles 27 as shown in FIGS. 6 and 8.

Figure 4:
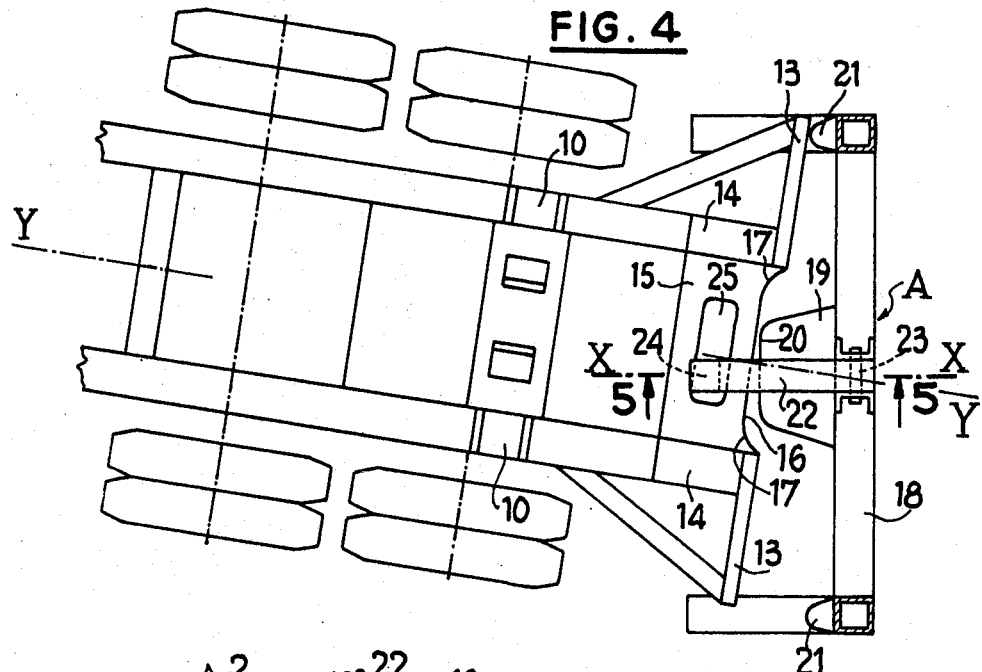
FIG. 4 is a plan view of the semi-trailer locked to the fixed installation.
Figure 5:
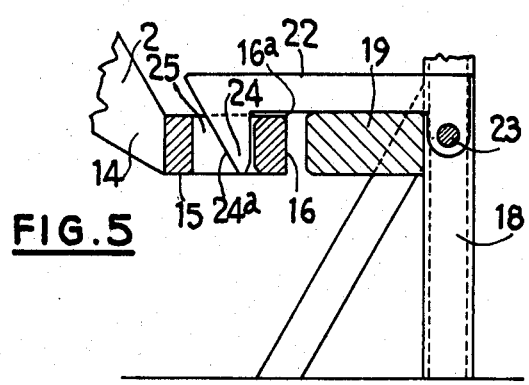
FIG. 5 is a sectional view taken on line 5—5 of FIG. 4, to an enlarged scale.
Figure 7:
FIG. 7 is a sectional view taken on line 7—7 of FIG. 6.

FIG. 6 shows the left side of the semi-trailer and container as viewed in FIG. 4 in respect of which the corner 26 is longitudinally the most remote from the rear bearing surface 29 on the associated cradle 27. FIG. 8 shows the right side in respect of which the corner 26 and the rear support surface 29 of the corresponding cradle are at a short longitudinal distance from each other. If the jack 27 is actuated in the course of a first stage of the operation for placing the container on the site, the container is tipped, by rotation of the journals 11 in contact with the cylindrical surface 36 of the bearings 10. It is on the right side (FIG. 8) that the corner 26 contacts first, by its lower edge 28, the inclined plane 29 constituting the rear bearing surface of the associated cradle 27. The second stage starts at this moment, in the course of which the edge 28 slides along the inclined plane 29 (FIG. 10), which causes the journal 11 to slide on the inclined plane 30 constituting the front divergent surface of the bearing 10, whereas the left journal 11 continues to rotate in the cylindrical surface 36. During this second stage, the rear of the container is slanted and undergoes simultaneously a swaying movement or yaw which tends to correct the angular offset between the axes X—X and Y—Y. The third stage corresponds to the contact of the left corner 26 (FIG. 9) by the chamfer 31 of the lower aperture 32 with the front bearing surface 34 of the stud 33 of the associated cradle 27. The chamfer 31 then slides on this surface 34 and causes the journal 11 to slide on the inclined plane 35 constituting the rear divergent surface of the left bearing 10. In the course of the third raising stage, in view of the fact that the two journals 11 move away in opposite directions from the cylindrical surfaces 36 of the bearings 10, while rising, the swaying movement (which has a correcting action), of the rear of the container continues but there is also produced a rolling movement which tends to cancel out the slant.

The third stage terminates when the chamfer 31 of the right corner 26 (FIG. 10) comes into contact with the cylindrical surface 34 of the corresponding stud 33. The right journal 11 then reaching the limit of its sliding travel along the divergent surface 30, whereas on the left side, the relative slidings between the journal 11 and bearing 10 and between the corner 26 and the stud 33 continue (FIG. 9).

The fourth stage starts when the right journal 11 is raised out of contact with the divergent surface 30 and terminates at the instant when the edge 28 of the left corner 26 (FIG. 9) comes into contact with the rear bearing surface 29 of the associated cradle 27. The axes X—X and Y—Y are then coincident and the container bears fully against the frame A. The fifth stage or final stage, in respect of which the two journals 11 are fuly disengaged from the bearings 10, can then commence, the container tipping exclusively by the sliding of the corners 26 in contact with the cradles 27 and then by a double sliding, namely between the edge 28 and the inclined plane 29 and between the chamfer 31 and the cylindrical surface 24. The final position is shown in FIG. 11.

In the position of the semi-trailer locked to the frame A shown in FIG. 4, and owing to the clearance between the buffer 19 of the frame A and the planar faces 17 of the cross-member 15 of the semi-trailer, the right corner 26 is nearer to the inclined planar face 41a of the side wall 41 of the cradle 27 than the other corner 26. Consequently in the course of the raising operation, the right corner 26 the nearer to the plane of the surface 41a comes into contact with the latter by its lower end edge 28. The resulting sliding brings about a transverse reaction on the container 3 which displaces it transversely either without friction on the semi-trailer if the journals 11 of the container are already disengaged from the two bearings 10, or with friction by a sliding of the journals 11 in the bearings 10 and possibly a sliding between the surfaces 38 and 39 (FIG. 12). In the latter case, the flexibility of the suspension of the semi-trailer 2 enables this operation to be carried out without jamming. The lateral centering is therefore achieved without jerks and smoothly during the raising operations. Note that the transverse sliding just described has only a small influence on the previously described swaying movements or yaws.

When the container has reached the inclination corresponding to its storage position, the rear faces of the two corners 26 are fully in contact with the rear bearing surfaces 29 of the cradles. The cylindrical surface 34 of the studs 33 is then tangent to the lower plane 49 of the corners of the container. The masts 43 are then placed in position with the upper spherical ends 44 of the masts 43 bearing against cups 45 disposed on the sides and under the container toward the highest point of the floor thereof. The lower spherical parts 46 of the masts 43 bear against the cups 47 secured to the ground. The jacks 7 can now be retracted to lower the arms 4. As the container bears, on one hand, on the two cradles 27 of the fixed equipment 18 and, on the other hand, on the two masts 43, it is now possible to raise the lock member 22 and advance the semi-trailer 2.

The container take-up operations are the same as those for placing the container on the site but are carried out in reverse. The swaying movement or yaw which the container undergoes for aligning itself on the semi-trailer 2 and for its lateral positioning are obtained by the same means as for placing the container on the site.

Note that the inclination to the horizontal of the planar bearing surface 29 and of the stud 33 of the cradles 27 and, moreover, of the divergent planar surfaces 30 and 35 of the bearings 10, must be sufficient to ensure that the sliding is easy. This is why it is of interest to employ, as described and illustrated, corners constructed in accordance with the French standard NF H - 90- 005, which have in their lower part an opening which the stud 33 can enter. However, if for any reason it was decided to employ corners 44 which do not have an opening in the lower part thereof, it is possible to operate in accordance with the invention by replacing the cylindrical bearing surface 34 of the studs 33 by a cylindrical surface or a convex crown of rollers 45 which are rotatably mounted on a horizontal pin 46 (FIG. 14). The cradle 27 still has a planar rear bearing surface 29. Each of the members supporting the rollers further comprises a planar surface 51 which is perpendicular to the planar surface 29 and is tangent to the roller so as to form an additional bearing surface.

Means for locking the container to the frame A and the container to the semi-trailer, constructed in accordance with known means, ensure safety of operation. Thus, as described in French Pat. No. 2,296,544 (FIG. 15), the frame A is completed at the rear of the cradles 27 by an auxiliary support comprising two posts 56 each of which has in its upper part an inclined bearing plate 57 and a locking member 59 parallel to this plate. In the final position of inclination of the container 3 the upper standardized corners 58 of the end wall of the container abut the plates 57 and the locking members 59 enter the corner 58 and hold the container stationary. The locking members 59 may be disengaged by pulling on chains 60.

Other modifications or additions may be envisaged. Thus the journals 11 could be replaced by spherical heads in which case spherical cups extended in the form of a funnel would be substituted for the bearings 10. The bearings or cups could be provided on the container and the journals or spherical heads on the vehicle.

Having now described my invention what I claim as new and desire to secure by Letters Patent is:

1. In a system for handling a container which is usable as storage means, for example as a silo, and has at an end of the container two lower rear corners which are disposed symmetrically with respect to a median longitudinal plane of the container containing a longitudinal axis of the container, each of which corners defines three faces, said system comprising a vehicle on which the container may bear in a transporting position of the vehicle in which transporting position a pivotal connection between the container and the vehicle enables the vehicle to pivot about an axis and said longitudinal plane is coincident with a median longitudinal plane of the vehicle, jack means combined with support means carried by the vehicle and cooperative with the container for selectively raising and lowering the container by pivoting the container about said axis of pivotal connection, and a fixed installation for receiving the container in a position of use of the container, and comprising means for locking a central region of a rear end of the vehicle, after the vehicle has moved rearwardly toward the installation, the improvement comprising the following features:

the fixed installation comprises a frame contained in a median longitudinal plane of the installation and the position of use of the container is an inclined position in which inclined position a lower end portion of the container is set in position in the frame by said corners;

the axis of the pivotal connection between the container and the vehicle is embodied by two articulations, each of which articulations comprises a male element having a surface of revolution about a horizontal axis and a female element comprising a conjugate surface of revolution and divergent surfaces connected to the surface of revolution of the female element, said elements being laterally mounted symmetrically relative to said longitudinal plane of the vehicle, one element being mounted on the container and the other element on the vehicle, and being, under the effect of the force of gravity in mutual supporting relation by their surfaces of revolution for the transporting position and in the course of the pivoting corresponding to the start of the raising operation, while being disengageable from each other in the course of said raising operation;

the frame of the fixed installation comprises two fixed cradles disposed symmetrically with respect to said median longitudinal plane of the installation, each of the cradles comprising a front bearing surface and a rear bearing surface which are offset longitudinally of the installation and are conjugate to a corresponding one of said two corners of the container to ensure, after the locking of the central region of the rear of the vehicle and during the raising, the angular movement of the container, the self-centering of the container, that is to say the putting of said median longitudinal planes of the container and the installation into coincidence, and the setting of the container in the inclined position of use.

2. A system as claimed in claim 1, wherein in each cradle said front bearing surface extends downwardly and rearwardly and said rear bearing surface extends upwardly in a direction away from the front bearing surface, the surfaces of the articulations, the faces of the corners of the container and the surfaces of the cradles, cooperate in such manner that, during the raising, a front part of the container bears on said support means combined with the jack means and, adjacent the rear of the container, the surfaces of revolution of the articulations are first in mutual bearing contact and the bearing subsequently occurs on each side of the container between the male element of the corresponding articulation and one of said divergent surfaces of the female element and also between one of said bearing surfaces of the cradle and the associated corner of the container and, lastly, between said two bearing surfaces of the cradle and corresponding zones of the associated corner of the container, the angular movement of the container after the surfaces of revolution of the articulations have ceased to be in mutual bearing relation being ensured by a relative displacement of surfaces which are in mutual bearing contact until the final inclined position is reached in which position the said median longitudinal planes of the container are coincident.

3. A system as claimed in claim 1, wherein the front bearing surface of each cradle has an upwardly-facing convexity.

4. A system as claimed in claim 1, wherein the male elements of the articulations comprise two cylindrical shafts of the same diameter carried by the container and the female elements comprise two bearing means each of which bearing means is carried by the vehicle and comprises a part-cylindrical surface whose diameter corresponds to the diameter of the shafts and is extended by two upwardly divergent ramps.

5. A system as claimed in claim 1, wherein the male elements of the articulations comprise cylindrical shafts of the same diameter carried by the vehicle and the female elements comprise two bearing means each of which bearing means is carried by the container and comprises a part-cylindrical surface having a diameter corresponding to the diameter of the shafts and extended by two downwardly divergent ramps.

6. A system as claimed in claim 1, wherein the male elements of the articulations comprise two spherical heads fixed to the container and the female elements comprise cups disposed on the vehicle, each of which cups includes a concave spherical dome extended by surfaces constituting an upwardly divergent funnel.

7. A system as claimed in claim 1, wherein the male elements of the articulations comprise two spherical heads secured to the vehicle and the female elements comprise cups disposed on the container, each cup including a concave spherical dome extended by downwardly divergent surfaces constituting a funnel.

8. A system as claimed in claim 1, wherein the rear bearing surface of each cradle is a planar surface perpendicular to the direction in which said longitudinal axis of the container extends in the final inclined position of use of the container.

9. A system as claimed in claim 1, wherein the front bearing surface of each cradle comprises a cylindrical surface whose axis is perpendicular to said median longitudinal plane of the installation.

10. A system as claimed in claim 9, comprising, following on the cylindrical surface in a tangential manner, a planar surface parallel to the direction in which said longitudinal axis of the container extends in the final inclined position of use of the container.

11. A system as claimed in claim 1, wherein the front bearing surface of each cradle comprises a surface formed on a roller which is freely rotatable about an axis perpendicular to said median longitudinal plane of the installation.

12. A system as claimed in claim 11, wherein the surface of the roller has a convex peripheral crown.

13. A system as claimed in claim 1, wherein the face of each one of the corners of the container which, for the transporting position of the container, is a downwardly facing face, defines an orifice and the front bearing surface of each cradle is a cylindrical surface, the generatrices of which cylindrical surface are parallel to the direction in which said longitudinal axis of the container extends in the final inclined position of use of the container, said cylindrical surface being formed on a stud capable of partly entering the orifice of the lower face of the associated corner, the contact with the cylindrical bearing surface of the cradle occurring in the rear region of an entrance edge of said orifice.

14. A system as claimed in claim 1, wherein the frame of the fixed installation comprises lateral abutments which are cooperative with said two corners of the container.

15. A system as claimed in claim 1, comprising conjugate guiding and lateral abutment means on the vehicle and on the container for centering the container with respect to the vehicle.

16. A system as claimed in claim 1, wherein the frame of the fixed installation comprises buffer means for preventing said lower rear corners of the container from coming into contact with the cradles when the vehicle which carries the container approaches the frame in reverse.

17. A system as claimed in claim 16, wherein said buffer means comprise a central buffer and two lateral buffers which are capable of preventing the vehicle to approach sufficiently to enable said locking means to engage and lock the rear of the vehicle when the angle that said median longitudinal plane of the vehicle makes with said median longitudinal plane of the installation exceeds a given value.

18. A system as claimed in claim 1, wherein said jack means comprise, on each side of the vehicle, a jack having a rod and said support means comprise, on each side of the vehicle, an arm which is pivoted to the vehicle and has a free end which carries a roller, and a runway which is carried by an underside of the container, said rod being pivoted to said arm and said roller being cooperative with said runway.

19. A system as claimed in claim 1, wherein the fixed installation further comprises support means for supporting a frong part of the container in the position of use of the container.

20. A system as claimed in claim 1, wherein the frame of the fixed installation comprises, at the rear of the two cradles, locking means and an auxiliary support against which support, in the inclined position of use of the container, two upper corners of the container opposed to said two lower rear corners on a lower end wall of the container bear in a position in which said upper corners can be retained by the locking means.

* * * * *